(12) United States Patent
Clark et al.

(10) Patent No.: US 8,755,845 B2
(45) Date of Patent: Jun. 17, 2014

(54) WIRELESS HEADSET SYSTEMS AND METHODS FOR ACTIVATING APPLICATION PROGRAMS ON PROCESSOR-BASED HOST

(75) Inventors: Mark P. Clark, Aptos, CA (US); Keith J. Derrick, Santa Cruz, CA (US); Steve C. Evans, Aptos, CA (US); Ilia V. Langouev, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1168 days.

(21) Appl. No.: 11/173,397

(22) Filed: Jul. 1, 2005

(65) Prior Publication Data
US 2007/0004463 A1    Jan. 4, 2007

(51) Int. Cl.
*H04M 1/00* (2006.01)

(52) U.S. Cl.
USPC ..................... 455/569.1; 455/575.2

(58) Field of Classification Search
USPC ........ 455/418–420, 557, 569.1, 575.2, 575.6, 455/561–563
See application file for complete search history.

(56) References Cited

U.S. PATENT DOCUMENTS

| | | | |
|---|---|---|---|
| 6,308,062 B1 | 10/2001 | Chien et al. | |
| 7,110,799 B1 * | 9/2006 | Willins et al. | 455/575.2 |
| 2003/0045235 A1 * | 3/2003 | Mooney et al. | 455/41 |
| 2004/0132510 A1 * | 7/2004 | Yamashita | 455/575.2 |
| 2004/0135819 A1 * | 7/2004 | Maa | 345/840 |
| 2004/0233901 A1 * | 11/2004 | Sung | 370/356 |
| 2005/0152294 A1 * | 7/2005 | Yu et al. | 370/310 |
| 2005/0174357 A1 * | 8/2005 | Wang | 345/581 |
| 2005/0272477 A1 * | 12/2005 | Boykins et al. | 455/569.1 |
| 2005/0286453 A1 * | 12/2005 | Gadamsetty et al. | 370/311 |
| 2006/0041433 A1 * | 2/2006 | Slemmer et al. | 704/275 |
| 2006/0166718 A1 * | 7/2006 | Seshadri et al. | 455/575.2 |
| 2006/0227760 A1 | 10/2006 | Elbaek et al. | |
| 2006/0242687 A1 * | 10/2006 | Thione et al. | 726/4 |

FOREIGN PATENT DOCUMENTS

| | | |
|---|---|---|
| EP | 1710988 A2 | 10/2006 |
| WO | WO9839941 A1 | 9/1998 |
| WO | WO0178443 A2 | 10/2001 |

* cited by examiner

*Primary Examiner* — George Eng
*Assistant Examiner* — Nam Huynh
(74) *Attorney, Agent, or Firm* — Chuang Intellectual Property Law

(57) ABSTRACT

Wireless audio headset systems and methods for automatically activating target application programs on an attached processor-based host are disclosed. The system generally includes a headset base to communicate with the host executing a headset integrator application, a wireless headset in wireless communication with the headset base and configured to transmit audio signals to and from the headset integrator application via the headset base, and a program activation mechanism provided by the wireless headset that, upon activation of the mechanism, activates a target application program on the processor-based host via the headset base and the headset integrator application.

24 Claims, 4 Drawing Sheets

WIRELESS HEADSET SYSTEMS AND METHODS FOR ACTIVATING APPLICATION PROGRAMS ON PROCESSOR-BASED HOST

BACKGROUND OF THE INVENTION

1. Field of the Invention

The present invention relates generally to wireless headsets for use with applications running on personal computers or other processor-based hosts. More specifically, wireless audio headset systems and methods for automatically launching a software program on an attached processor-based host are disclosed.

2. Description of Related Art

Audio headsets such as communication headsets are used in numerous applications. Communication headsets are particularly effective for telephone operators, customer service agents such as in call centers, radio operators, aircraft personnel, and/or any user who frequently use telephones or computer telephony applications and/or for whom it is desirable to have hands free operation of communication systems. Accordingly, a wide variety of communication headsets are available. For example, communication headsets may be adapted for use with corded and cordless conventional telephones, soft phones, cellular or mobile telephones, and the like.

The headset is typically in communication with a base unit, e.g., a base telephone, a computer (or other processor-based host), or a headset base which may in turn be in communication with the computer. The headset may be wired or wireless. A wireless headset provides added convenience and operability that is free of wires or cables. A wired headset may be connected to the base unit via a connector such as a Quick Disconnect™ (QD) connector so as to provide added convenience and operability. The QD connector may be a mechanical interconnect positioned between the headset and the base unit or between the headset and a telephone headset adapter connected to the base unit. The user may simply and quickly disconnect the headset at the QD connector rather than at the base unit so that the headset user does need not to remove the headset and, instead, can keep the headset on even when the user moves away from the base unit.

SUMMARY OF THE INVENTION

Wireless audio headset systems and methods for automatically launching a software program on an attached processor-based host are disclosed. It should be appreciated that the present invention can be implemented in numerous ways, including as a process, an apparatus, a system, a device, or a method. Several inventive embodiments of the present invention are described below.

The system generally includes a headset base to communicate with the host executing a headset integrator application, a wireless headset in wireless communication with the headset base and configured to transmit audio signals to and from the headset integrator application via the headset base, and a program activation mechanism provided by the wireless headset that, upon activation of the mechanism, activates a target application program on the processor-based host via the headset base and the headset integrator application.

Upon activation of the program activation mechanism, the wireless headset may transmit a message containing a key code corresponding to the program activation mechanism to the headset base via a wireless link therebetween. The headset base may decode the message, e.g., by mapping or decoding the message to a vendor-specific Human Interface Device (HID) button in a USB HID descriptor for the headset system, to generate program activation data. The headset base may then transmit the program activation data to the headset integrator application.

The system may generally include one or more of the program activation mechanisms, each being configured to automatically activate a corresponding application program on the processor-based host via the headset base and the headset integrator application. The user may specify the target application program associated with each program activation mechanism via the headset integrator application. Each target application program may be an audio application program or a non-audio application program. Examples of audio application programs include an auto-dialer application, a speech recognition program, a softphone application such as a Voice over Internet Protocol (VoIP) softphone-headset application, an intercom communication-headset application, an Internet chat-headset application, or an Internet telephony-headset application. Examples of non-audio application programs include a word processing application, a spreadsheet application, an email application, and an Internet browser application.

Each of the headset base and the wireless headset may include a Digital Enhanced Cordless Telecommunications (DECT) controller to facilitate communication between the headset base and the wireless headset using DECT compliant technology. In addition, the headset base may be configured to be in communication with the processor-based host via a universal serial bus (USB) port of the host.

According to another embodiment, the method may generally include transmitting a message containing a key code corresponding to a program activation mechanism provided by a wireless headset upon activation thereof from the wireless headset to a headset base in wireless communication with the wireless headset, mapping the message to data upon receiving the message by the headset base, transmitting the data from the headset base to a headset integrator application executing on a processor-based host, and activating an application program corresponding to the program activation mechanism on the processor-based host by the headset integrator application in response to receiving the data from the headset base.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Wireless audio headset systems and methods for automatically launching a software program on an attached processor-based host are disclosed. It is noted that communications calls as referred to herein include not only telephone calls but various other communication calls including, for example, intercom, Internet chat, and the like. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
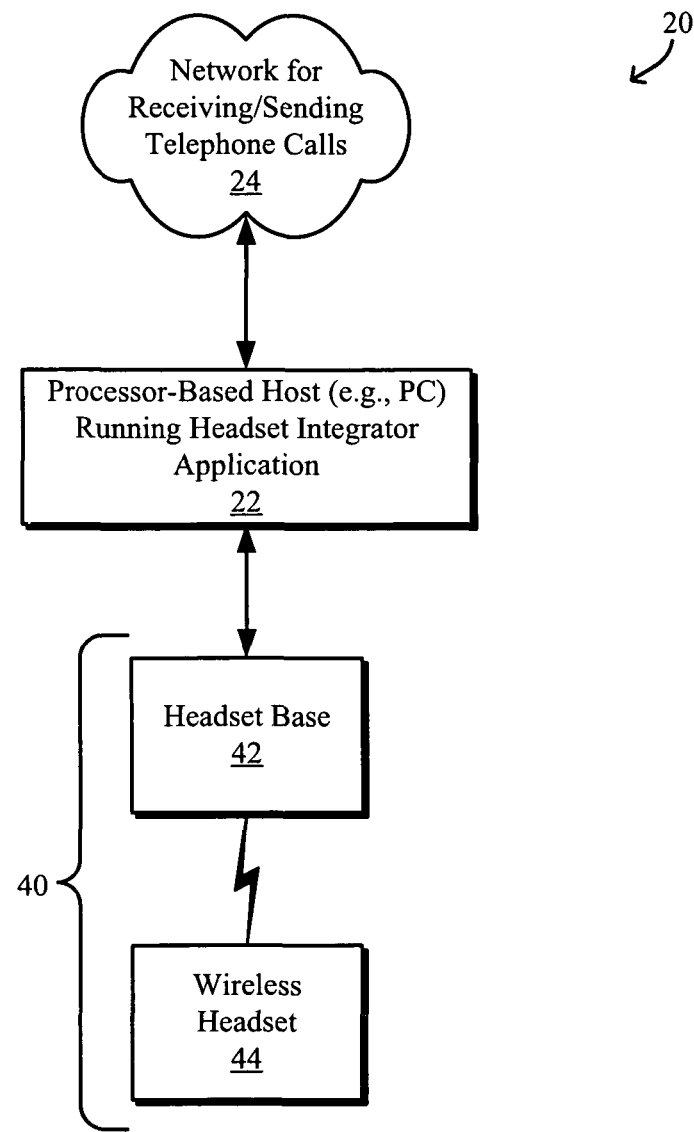
FIG. 1 is a block diagram illustrating an exemplary embodiment of a system in which a wireless headset system is in communication with a processor-based host.

FIG. 1 is a block diagram illustrating an exemplary embodiment of a processor-based host and wireless headset system 20, e.g., a digital wireless softphone VOIP headset system in which a wireless headset apparatus or system 40 is in communication with a processor-based host 22 executing a softphone application. The digital wireless headset system 20 may implement DECT (Digital Enhanced Cordless Telecommunications) compliant technology, a European cordless phone standard, or any other suitable protocol and/or standard. It is noted that although in the examples presented herein, the wireless headset system 20 is implemented and/or utilized with a softphone software application, the wireless headset system 20 may be similarly implemented and/or utilized with various other host mediated network communication applications such as intercom, Internet chat, Internet telephony, voice over data such as VoIP softphone, and the like and/or other audio applications such as a speech recognition application.

As shown, the wireless headset system 40 generally includes a headset base 42 and a wireless headset 44. The wireless headset 44 is in wireless communication, e.g., using radio frequency (RF) technology, with the headset base 42. The headset base 42 is in turn in communication with the host device 22 such as via a connection to a Universal Serial Bus (USB) port provided on the host device 104 or any other suitable communication port or mechanism. For example, although a wired connection is typically employed between the headset base 42 and the host 22, wireless connections may alternatively be employed. Thus, the term "connection" utilized herein generally refers to both wired and wireless connections. In addition, the wireless headset 44 and/or the headset base 42 may be selectively powered on or off and thus be selectively in communication with each other and/or with the host 22.

The processor-based host 22 may be in communication with one or more networks 24 for receiving incoming and sending outgoing communication calls. The network 24 may be for example, the Internet, an intranet network, or a LAN (local area networks). Although not shown, the network 24 may be in communication with other networks including, for example, a public switched telephone network (PSTN) or a Private Branch Exchange (PBX) for completing a communication call on a remote end to a remote call recipient or remote caller. The processor-based host 22 generally can be any suitable processor-based device such as a personal computer (PC), a personal digital assistant (PDA), a digital music player (e.g., MP3 player), a video player (e.g., DVD player), a video game player, and a processor-based telephone. Although shown as separate components, the host 22 and the headset base 42 may be integrated as a single component.

Figure 2:
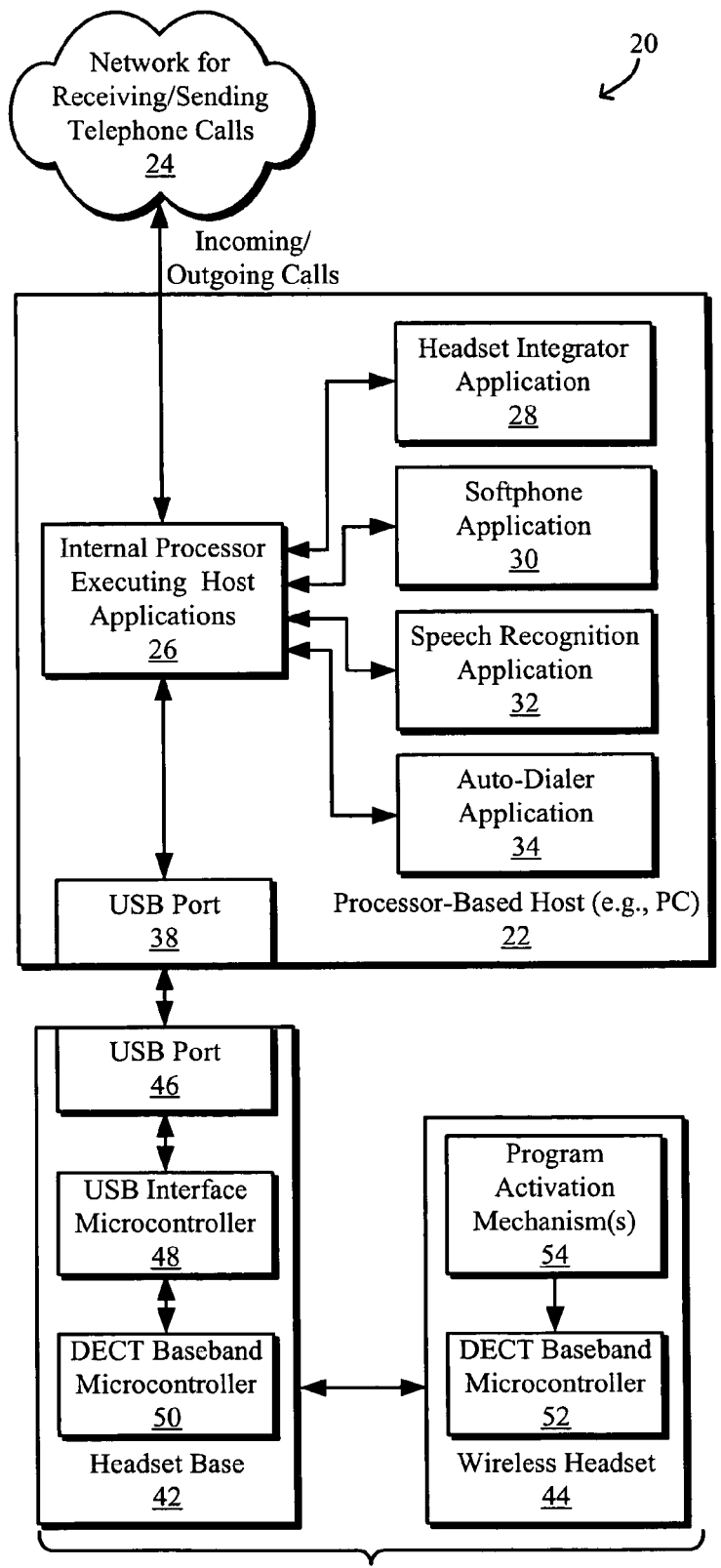
FIG. 2 is a block diagram illustrating the system of FIG. 1 in more detail.

FIG. 2 is a block diagram illustrating the processor-based host and wireless headset system 20 in more detail. The processor-based host and wireless headset system 20 may be implemented with voice over Internet Protocol (VoIP) technology for receiving incoming and making outgoing communication calls via the network 24. In particular, the host 22 may execute a softphone application 30 such as a VoIP telephony software application and a wireless headset integrator application 28 to facilitate the receiving of incoming and the placing of outgoing communication calls using the wireless headset 44 via the headset base 42. Specifically, the softphone application 30 facilitates communication with the network 24 for receiving and placing communication calls and interfaces with the headset integrator application 28 for facilitating transfer of audio signals between the headset system 40 and the host 22. Although the softphone application 30 and the wireless headset integrator application 28 are described separately herein, it is to be understood that the functions of headset integrator application may be integrated into a single softphone headset integrated application, for example.

The headset base 42 not only facilitates communication between the wireless headset 44 and the host 22 but may optionally also serve as a cradle to facilitate storage of the wireless headset 44 and/or recharging of a rechargeable battery contained in the wireless headset 44. It is noted that a docking and/or charging portion or component of the headset base 42 may be physically integrated with the headset base 42 or may be a physically separate component from the remainder of the headset base 42. The headset base 42 may be powered via the USB connection but can be alternatively or additionally be powered via an external power source such as via an alternating current (AC) adapter. The external power source may facilitate the recharging of the wireless headset 22 when the host 22 is powered down, for example, and/or may supplement the power provided via the USB connection.

As shown, the processor-based host 22 includes an internal processor 26 such as a CPU that controls hardware and application software on the host. For example, the internal processor 26 may execute software applications such as the softphone application 30 and the headset integrator application 28. The term softphone application generally refers to a telephony application running on a PC or other processor-based host. The internal processor 26 may additionally or alternatively execute other software applications such as a speech recognition application 32 and/or an auto-dialer application 34. The auto-dialer application may be configured to dial a Private Automatic Branch Exchange (PABX) access number for a voice dialer or to connect to an operator. The headset base may include a base communication port through which to communicate with a corresponding communication port of the host 22. For example, the base port may be a base USB port 46 corresponding to a host USB port 38.

The headset base 42 may further include a base DECT baseband microcontroller 50 to implement DECT compliant technology and a USB interface microcontroller 48 to interface between the base DECT baseband microcontroller 50 and the base USB port 46. A headset DECT baseband microcontroller 52 may also be provided in the wireless headset 44 to communicate with the base DECT controller 50. It is to be understood that while the headset system 40 is described herein to implement the DECT compliant technology, other technologies, protocols and/or standards may be similarly implemented.

The wireless headset 44 may include one or more program activation mechanisms such as program activation buttons 54 for automatically launching a target or designated application program on the corresponding processor-based host 22 in response to user activation of a program button on the wireless headset. Each program button may be associated with a corresponding user-specified or default target application program. Specifically, when a user activates, e.g., depresses, a program button 54, the processor-based host 22 automatically launches a corresponding target application program. Although not shown, the headset base may alternatively or additionally provide the one or more program buttons 54. The target application program may be any suitable application program such as the softphone application 30, the speech recognition application 32, the auto-dialer application 34, an intercom communication-headset application, an Internet chat-headset application, and an Internet telephony-headset application, and/or various other audio applications (e.g., one that receives input from the user via the headset and/or outputs audio to the user via the headset) and/or non-audio applications. Examples of non-audio applications may include a word processing application, a spreadsheet application, an email application or an Internet browser application. Where the target application program is an audio application, the target application program may optionally also interface with the headset integrator application to facilitate receiving and/or outputting data from and to the wireless headset via the headset base.

Figure 3:
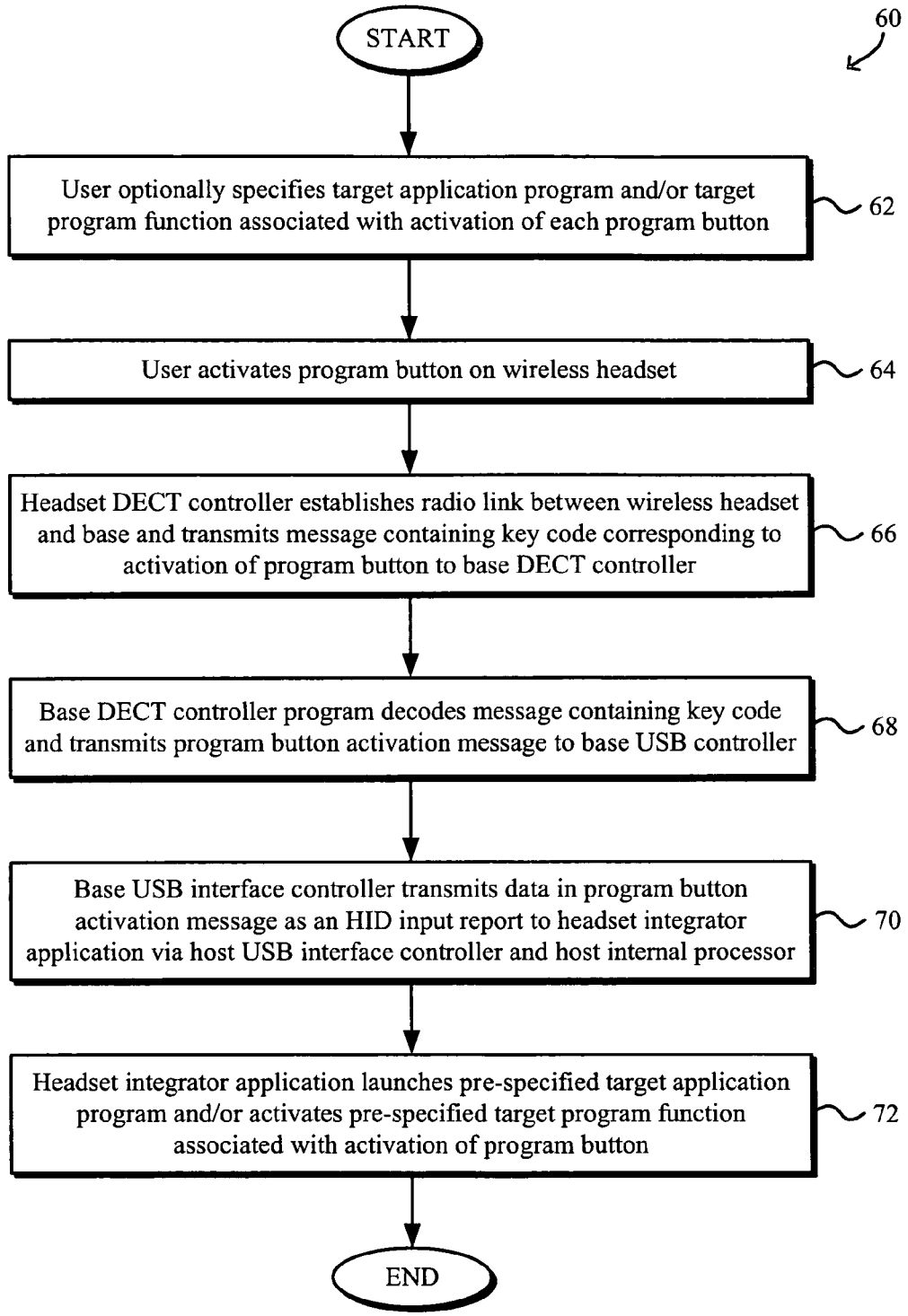
FIG. 3 is a flow chart illustrating an exemplary process for automatically launching a designated application program in response to user activation of a program button on the wireless headset.

FIG. 3 is a flow chart illustrating an exemplary process 60 for automatically launching a target or designated application program on the corresponding processor-based host in response to user activation of a program button on the wireless headset. Specifically, the process 60 enables a user to automatically launch a target application program on the processor-based host by activating the program button provided on the wireless headset (and/or the headset base).

In particular, at block 62, the user may optionally specify the target application program and/or a target program function associated with activation of each program button. Typically, the program button automatically launches a target application program. Alternatively or additionally, the program button may automatically activate a target program function, e.g., begin speech recognition, auto-dialer a pre-specified telephone number, etc. At block 64, the user may activate the desired program button on the wireless headset.

At block 66, the headset DECT controller in the wireless headset establishes radio link between the wireless headset and the headset base and transmits a message containing a specific key code corresponding to activation of program button over the wireless radio link to the base DECT controller in the headset base. The message conveying the key code may be, for example, part of a proprietary data packet known as an Escape To Proprietary (ETP) in DECT protocol or, as another example, a standard DECT key press message. Note that where the user activates the program button on the headset base (if provided), block 66 need not be performed.

At block 68, when the base DECT controller receives the ETP message containing the key code from the wireless headset, the base DECT controller may decode the ETP message and transmit a program button activation message to the base USB controller. Communication between the headset base USB and DECT controllers may be via, for example, an Intelligent Interface Controller (I2C) bus shared therebetween or via various other suitable buses. It is noted that the functions of the USB and DECT microcontrollers may also be provided in a single device.

At block 70, the base USB controller in turn transmits the data in the program button activation message to the headset integrator application, e.g., as a Human Interface Device (HID) input report on the telephony report ID, via the host USB interface controller and the host internal processor. Specifically, the base USB controller may map the program button activation message to a vendor-specific HID button, e.g., bit, in the HID descriptor for the headset system (or the headset base). As is known, the HID descriptor gives the host operating system knowledge of each control for the headset system.

As with the examples described herein, the headset system may be a Human Interface Device (HID). HID is a class of USB devices such as a mouse, joystick, keyboard, and the like that gives structure to the data transferred between the device and the host using a generic HID driver supplied by the host's operating system so that the host can interpret the data received from the USB device without a separate device driver specially designed for the particular HID. As is well known, USB allows two-way communication between peripheral devices and a processor-based host. When the USB headset base unit is initially connected to the host, the host (or a hub) detects the USB headset base unit and performs an enumeration process that may assign an identifier to the device and inform the host computer of the capabilities of the USB headset base unit (e.g., input, output, etc). The USB headset base unit typically also informs the host of its identification information, such as the vendor, product, version, serial number, and/or the like. In addition, as an HID, the USB headset base unit may, during the USB enumeration process, identify itself as an HID, describe the information that it can receive and send, and describe how the data should be interpreted to the host, e.g., via the HID descriptor. Although the headset system is described as an HID in the examples presented herein, the headset system need not be an HID and a separate device driver may be supplied to facilitate communication between the host and the non-HID headset system. Furthermore, although the headset system is described as being in communication with the host via USB ports, various other suitable communications ports may be similarly utilized.

At block 72, the headset integrator application may, in response to receiving the data in the program button activation message, e.g., as an HID input report on the telephony report ID, launch a pre-specified target application program and/or activate a pre-specified target program function associated with activation of program button. The headset integrator application may also optionally transmit a release audio link message to the headset base to release the audio link, for example, where the target application program is a non-audio application program in order to maximize battery life of the wireless headset when the headset is not in use.

As is evident, the process 60 for automatically launching a target application program on the corresponding processor-based host in response to user activation of a program button on the wireless headset enables the user to quickly access a default or user-specified target host application program (and/or activate a target program function such as auto-dial a user-specified telephone number, e.g., voicemail). Examples of target applications include a speech recognition program (e.g., for the user to dictate a memo via the wireless headset), a VOIP softphone application (e.g., for the user to make/receive telephone calls), an autodialer application (e.g., for the user to dial a PABX access number for a voice dialer or to connect to an operator). It is noted that the process 60 described above with reference to FIG. 3 is merely an illustrative implementation and various modifications, such as changing the order of the individual blocks of the process 60, may be implemented.

Figure 4:
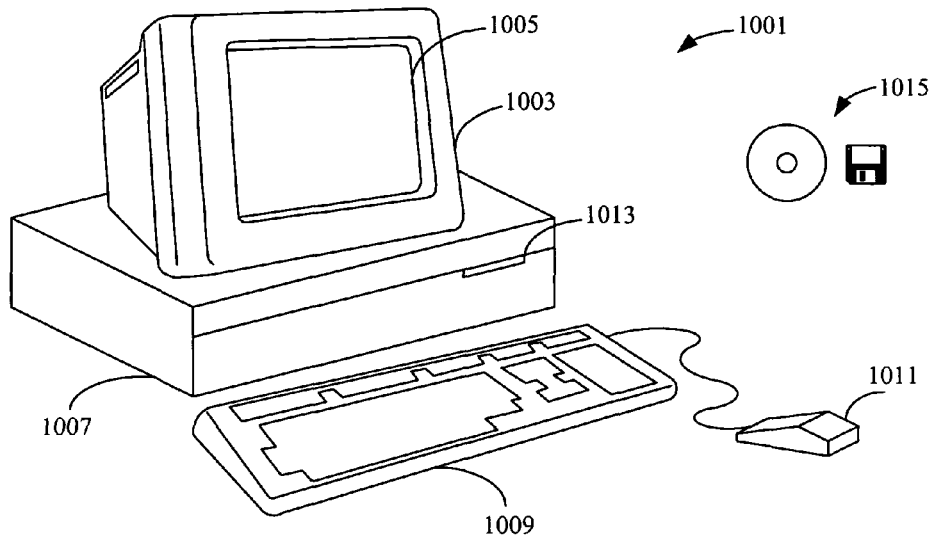
FIG. 4 illustrates an example of a computer system that can be utilized with the various embodiments of method and processing described herein.
Figure 5:
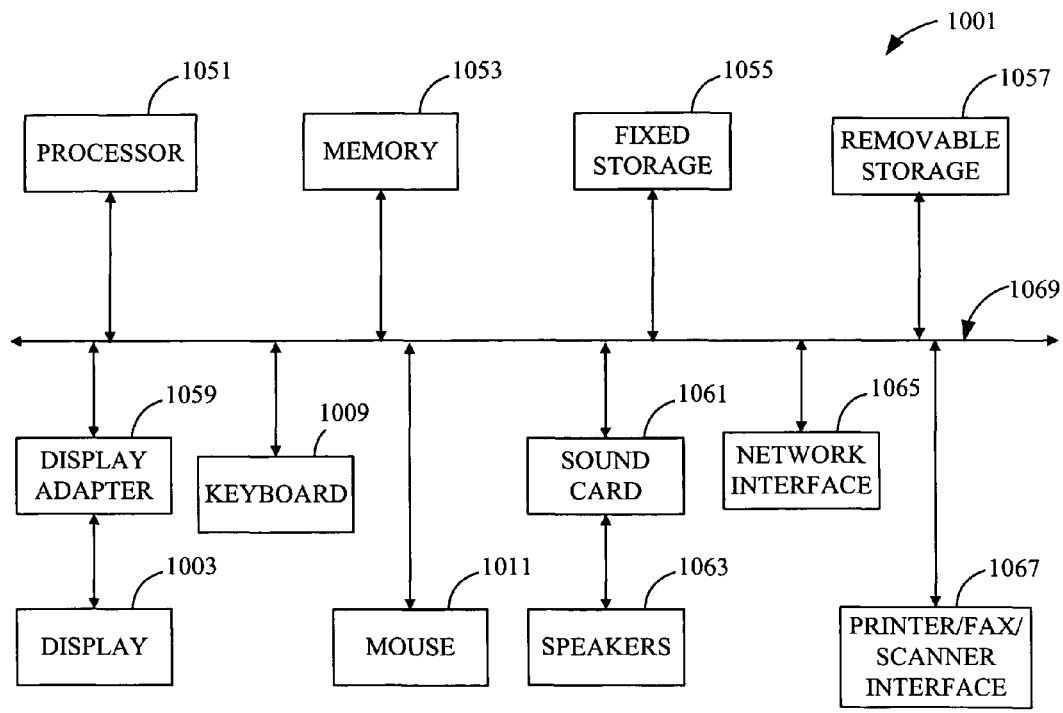
FIG. 5 illustrates a system block diagram of the computer system of FIG. 4.

FIGS. 4 and 5 illustrate a schematic and a block diagram, respectively, of an exemplary general purpose computer system 1001 suitable for executing, for example, softphone and/or headset integrator applications described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A system, comprising:
a headset base configured to communicate with a processor-based host executing a headset integrator application;
a wireless headset in wireless communication with the headset base, the wireless headset being configured to transmit audio signals between the headset and headset integrator application executed by the host via the headset base; and
a program activation mechanism provided by the wireless headset comprising a plurality of program activation buttons on the wireless headset, each program activation button mapped to a corresponding target application program and configured to, upon depression, automatically activate its corresponding associated target application program on the processor-based host via the headset base and the headset integrator application by transmitting a message containing a key code corresponding to the program activation mechanism to the headset base, the headset base being further configured to decode the message containing the key code to generate program activation data and to transmit the program activation data to the headset integrator application executing on the processor-based host.

2. The system of claim 1, wherein the target application program is an application program specified by a user via the headset integrator application.

3. The system of claim 1, wherein activation of the target application program is selected from the group consisting of (1) launching the target application program, (2) activating a target function of the target application program, and (3) launching the target application program and activating a target function of the target application program.

4. The system of claim 1, comprising a plurality of the program activation mechanisms, each program activation mechanism being configured, upon activation, to automatically activate a corresponding target application program on the processor-based host via the headset base and the headset integrator application.

5. The system of claim 1, wherein the target application program is an audio program selected from the group consisting of an auto-dialer application, a speech recognition program, a softphone application, an intercom communication-headset application, an Internet chat-headset application, and an Internet telephony-headset application.

6. The system of claim 1, wherein the target application program is a Voice over Internet Protocol (VoIP) softphone-headset application.

7. The system of claim 1, wherein the target application program is a non-audio program selected from the group consisting of a word processing application, a spreadsheet application, an email application, and an Internet browser application.

8. The system of claim 1, wherein each of the headset base and the wireless headset includes a Digital Enhanced Cordless Telecommunications (DECT) controller to facilitate communication between the headset base and the wireless headset using DECT compliant technology.

9. The system of claim 1, wherein the headset base is configured to be in communication with the processor-based host via a universal serial bus (USB) port of the host.

10. The system of claim 1, wherein the headset base and the wireless headset are further configured to establish an audio link therebetween upon activation of the program activation mechanism.

11. The system of claim 1, further comprising the processor-based host.

12. A method, comprising:
transmitting a message containing a key code from a wireless headset to a headset base in wireless communication with the wireless headset, the key code corresponding to depression of a program activation button selected from a plurality of program activation buttons on the wireless headset, wherein each of the plurality of program activation buttons is associated with a target application program residing on a processor based host, the wireless headset and the headset base being a headset system;
mapping the message to data upon receiving the message by the headset base;
transmitting the data from the headset base to a headset integrator application executing on a processor-based host; and
activating a target application program corresponding to the program activation button depressed on the processor-based host by the headset integrator application, in response to receiving the data from the headset base.

13. The method of claim 12, wherein activating the target application program includes at least one of:
launching the target application program; and
activating a target function of the target application program.

14. The method of claim 12, further comprising:
specifying the target application program via the headset integrator application.

15. The method of claim 12, wherein the mapping the message to data includes decoding the message containing the key code to a vendor-specific Human Interface Device (HID) button in an HID descriptor for the headset system.

16. The method of claim 12, wherein the wireless headset provides a plurality of the program activation mechanisms, each program activation mechanism being associated with a corresponding target application program on the processor-based host.

17. The method of claim 12, wherein the target application program is an audio program selected from the group consisting of an auto-dialer application, a speech recognition program, a softphone application, an intercom communication-headset application, an Internet chat-headset application, and an Internet telephony-headset application.

18. The method of claim 12, wherein the target application program is a Voice over Internet Protocol (VoIP) softphone-headset application.

19. The method of claim 12, wherein the target application program is a non-audio program selected from the group consisting of a word processing application, a spreadsheet application, an email application, and an Internet browser application.

20. The method of claim 12, wherein each of the headset base and the wireless headset includes a Digital Enhanced Cordless Telecommunications (DECT) controller to facilitate communication between the headset base and the wireless headset using DECT compliant technology.

21. The method of claim 12, wherein the headset base is configured to be in communication with the processor-based host via a universal serial bus (USB) port of the host.

22. The method of claim 12, further comprising:
establish an audio link between the headset base and the wireless headset upon activation of the program activation button.

23. The system of claim 1, wherein the headset base comprises a headset base program activation button associated with a corresponding target application program on the processor-based host, the headset base program activation button configured to, upon depression, automatically activate the corresponding target application program on the processor-based host.

24. The system of claim 12, wherein the headset base comprises a headset base program activation button associated with a corresponding target application program on the processor-based host, the headset base program activation button configured to, upon depression, automatically activate the corresponding target application program on the processor-based host.

* * * * *